United States Patent
Van Gorp et al.

(10) Patent No.: US 10,094,736 B2
(45) Date of Patent: Oct. 9, 2018

(54) METHOD FOR DETECTING COMPRESSED AIR SYSTEM LEAKAGE

(71) Applicant: SCHNEIDER ELECTRIC USA, INC., Palatine, IL (US)

(72) Inventors: John C. Van Gorp, Sidney (CA); David Gordon Clark, North Saanich (CA); Anthony R. Gray, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 509 days.

(21) Appl. No.: 14/800,835

(22) Filed: Jul. 16, 2015

(65) Prior Publication Data
US 2017/0016800 A1     Jan. 19, 2017

(51) Int. Cl.
G01M 3/00 (2006.01)
G01M 3/40 (2006.01)

(52) U.S. Cl.
CPC ........................ G01M 3/40 (2013.01)

(58) Field of Classification Search
CPC ........................ G01M 3/00; G01M 3/40
See application file for complete search history.

(56) References Cited

U.S. PATENT DOCUMENTS

| | | | |
|---|---|---|---|
| 5,218,859 A * | 6/1993 | Stenstrom | E03B 7/003 73/40.5 R |
| 7,056,097 B2 | 6/2006 | Lake | |
| 7,089,815 B2 * | 8/2006 | Fogelstrom | B60T 17/02 702/98 |
| 7,186,094 B2 | 3/2007 | Edlund et al. | |
| 7,412,876 B2 | 8/2008 | Kates | |
| 2006/0162427 A1 * | 7/2006 | Horie | F25B 49/005 73/40.7 |
| 2007/0102529 A1 | 5/2007 | Sellew et al. | |

(Continued)

FOREIGN PATENT DOCUMENTS

| | | |
|---|---|---|
| EP | 2746744 A1 | 6/2014 |
| JP | H11271170 A | 10/1999 |

OTHER PUBLICATIONS

"Druckluft Effizient: Compressed Air Facts", Oct. 31, 2003 (Oct. 31, 2003), pp. 1-5, XP055014406, Karlsruhe/Germany, Retrieved from the Internet: URL:http://www.druckluft-effizient.de/downloads/fakten/facts-00-09.pdf [retrieved on Dec. 9, 2011] the whole document.

(Continued)

Primary Examiner — Daniel S Larkin
(74) Attorney, Agent, or Firm — Lando & Anastasi, LLP

(57) ABSTRACT

A method of detecting leakage in a compressed air system having a compressor includes configuring an electrical monitor to measure one or more electrical parameters indicative of operation of the compressor. The method further includes identifying periods of time during which the compressor is not in use; analyzing running times and intervals of the compressor between compressor operations during one or more of identified periods of time to establish a baseline for air leakage. The method further includes continuing to analyze running times and intervals of the compressor between compressor operations when the compressor is not in use. The method further includes notifying one or more users when running times and intervals between compressor operations vary from the baseline.

18 Claims, 5 Drawing Sheets

(56) References Cited

U.S. PATENT DOCUMENTS

| | | |
|---|---|---|
| 2010/0021314 A1 | 1/2010 | Lee |
| 2010/0188240 A1 | 7/2010 | Wells |
| 2012/0072140 A1 | 3/2012 | Cowan et al. |
| 2012/0103070 A1* | 5/2012 | Lo .......................... G01M 3/06 73/40.5 R |
| 2015/0013436 A1* | 1/2015 | Heaton ................... G01M 3/28 73/40.5 R |

OTHER PUBLICATIONS

Extended European Search Report from corresponding European Application No. 16179105.8 dated Nov. 28, 2016.

* cited by examiner

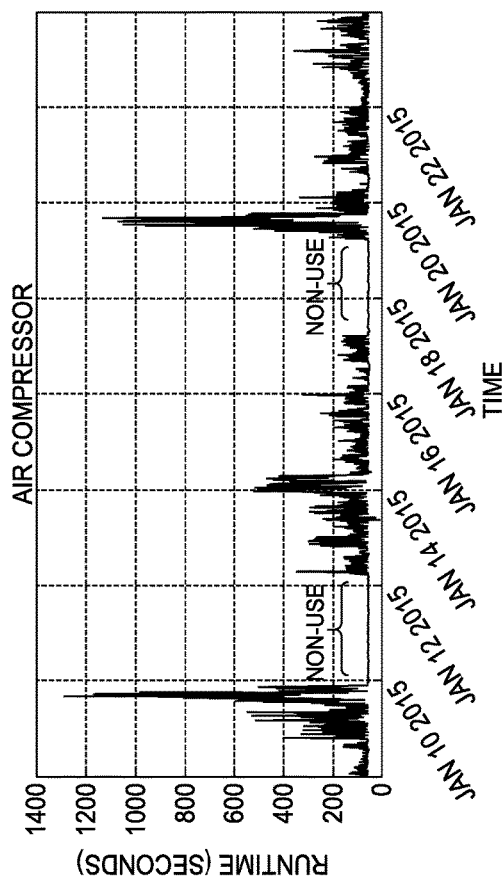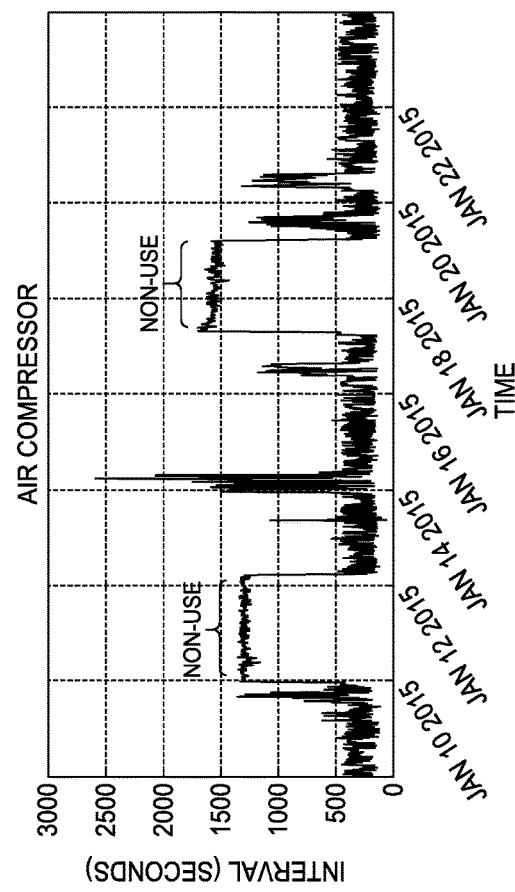

METHOD FOR DETECTING COMPRESSED AIR SYSTEM LEAKAGE

BACKGROUND OF THE INVENTION

1. Field of the Invention

This disclosure relates generally to devices used to monitor apparatus, and more particularly to systems and related methods for detecting air leakage with a compressed air system.

2. Discussion of Related Art

A U.S. Department of Energy study notes that leaks are a significant source of wasted energy in compressed air systems having compressors, often wasting as much as 20-30% of compressor output. In one scenario, this study estimated that 10×¼ inch leaks in a typical compressed air system can cost more than $10,000 annually. One of the most common methods for finding leaks is the use of an ultrasonic acoustic detector, which detects the high-frequency sound associated with escaping compressed air. Regular checks with such ultrasonic detectors can be time consuming, requiring a technician to inspect each tool that uses compressed air and to inspect each section of the compressed air system.

SUMMARY OF THE INVENTION

One aspect of the present disclosure is directed to a method of detecting leakage in a compressed air system having a compressor. In one embodiment, the method comprises: configuring an electrical monitor to measure one or more electrical parameters indicative of operation of the compressor; identifying periods of time during which the compressor is not in use; analyzing running times and intervals of the compressor between compressor operations during one or more of identified periods of time to establish a baseline for air leakage; continuing to analyze running times and intervals of the compressor between compressor operations when the compressor is not in use; and notifying one or more users when running times and intervals between compressor operations varies from the baseline.

Embodiments of the method further may include, when configuring an electrical monitor to measure one or more electrical parameters, capturing and logging compressor running time each time the compressor operates. The one or more electrical parameters may include an ON state and an OFF state of the compressor. Example parameters may include kilowatts (kW), kilovolts-amperes reactive (kvar), kilovolt-amps (kVA), or average phase current. A parameter value marking a boundary between the ON and OFF states of the compressor may be selected. Operation of the compressor may include start times and stop times, with start times defined as a change from the OFF to ON state, and stop times defined as a change from the ON to OFF state. The monitor may log parameter values at regular intervals, and a controller receiving log data may determine the compressor start, stop, and running times. The monitor may be configured to log compressor run times directly, using a set point to start a timer when the compressor switches ON and capturing the value of the timer when the compressor switches OFF. Periods of time during which the compressor is not in use are identified by specified periods of time including between certain hours of the day, or days in the week, or between scheduled shifts. Periods of time during which the compressor is not in use may be identified when compressor energy consumption over a predetermined interval is below a threshold. Periods of time during which the compressor is not in use may be identified by examining running time duration and intervals between compressor operations for an expected pattern. Compressor running times and intervals between compressor operations may be analyzed to establish a baseline value for air leakage in the compressed air system. The baseline value may be established by generating baseline summary values of running times and the intervals between compressor operations over several non-use periods. Current summary values of running times and intervals between compressor operations may be generated for current non-use periods and compared to the baseline summary values. If the current summary values differ by a predetermined amount from the baseline summary values, a notification may be sent to one or more users. The predetermined amount may be represented as a statistically significant difference between the baseline summary values and the current summary values. The predetermined amount exceeds a threshold that represents an increase or decrease in air leakage that is of interest to a user. A user may configure the monitoring system to report current summary values at scheduled intervals.

These and other features and advantages of the present disclosure will now be described in greater detail with reference to the accompanying drawings, detailed description and claims.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 4A is a graph of an air compressor showing running time versus time; and

FIG. 4B is a graph of an interval between compressor operations versus time.

DETAILED DESCRIPTION OF THE INVENTION

Figure 1:
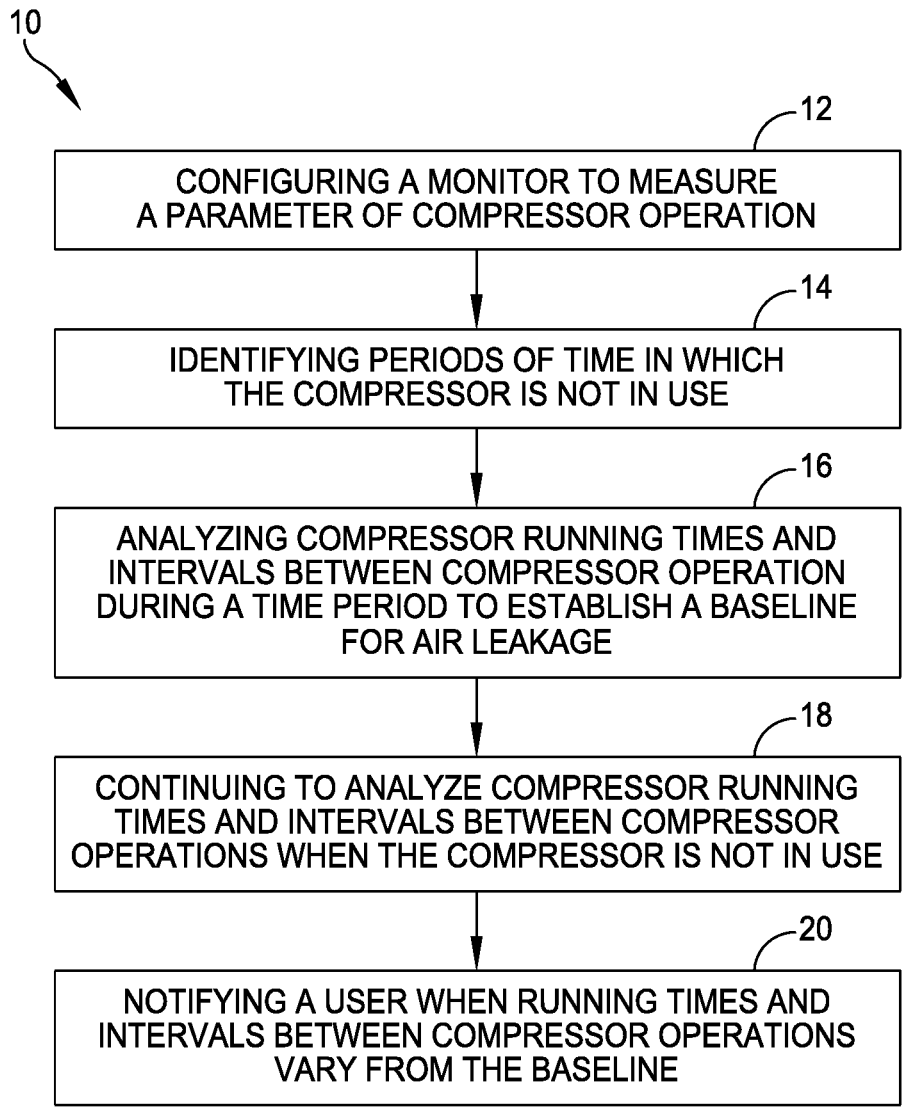
FIG. 1 is a diagram of a method of detecting leakage in a compressed air system having a compressor.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

This present disclosure is directed to a method of monitoring an air compressor for changes in operation that indicate an increase (or decrease) in compressed air leakage. An electrical monitor is configured to measure one or more electrical parameters that are correlated with operation of the compressor and derive the compressor running time from the measured data. Each running time duration (and the interval between compressor operations) is analyzed during time periods when compressed air is not being used. Most compressed air systems have some air leakage, and this constant air leakage results in a regular pattern of brief air compressor operations. A change in this pattern indicates a change in air leakage, with an increase in air leakage resulting in one or both of (a) an increase in running time duration; and (b) a decrease in the interval between compressor operations.

Referring to FIG. 1, a compressed air system leakage detection method is generally indicated at 10. In one embodiment, the method includes configuring an electrical monitor associated with the compressed air system to measure one or more electrical parameters indicative of compressor operation. This method step is indicated at 12 in FIG. 1. The monitor is configured to capture and log compressor running time each time the compressor operates. In some embodiments, the monitor is associated with a controller or CPU provided with the compressed air system and/or the compressor.

The method 10 further includes identifying periods of time during which the compressed air system is not in use. The non-use periods of time may be displayed by the monitor and/or stored within the controller associated with the compressed air system and/or the compressor. This method step is indicated at 14 in FIG. 1.

The method 10 further includes analyzing compressor running times and intervals between compressor operations during one or more of the periods of time identified in step 14. Once analyzed, a baseline for air leakage is established. This method step is indicated at 16 in FIG. 1.

The compressor running times and intervals between compressor operations are continued to be analyzed when the compressed air system is not in use. This method step is indicated at 18 in FIG. 1. When the running times and/or intervals between the compressor operations vary from the baseline, the operator is notified by a notification provided to the monitor. This method step is indicated at 20 in FIG. 1.

In step 12, an electrical monitor is configured to measure electrical parameters that are indicative of air compressor operation. Useful parameters are those that clearly show the start and stop of the air compressor, and example parameters include kilowatts (kW), kilovolts-amperes reactive (kvar), kilovolt-amps (kVA), and average phase current. A parameter value marking the boundary between compressor ON and OFF states is selected. Compressor operation is comprised of start times and stop times, with start times defined as a change from the OFF to ON state, and stop times defined as a change from the ON to OFF state. The compressor running time is defined as the time period between start time and stop time.

In one implementation, the monitor logs parameter values at regular intervals and the controller or central processor receiving this log data determines the compressor start, stop, and running times. In another implementation, the monitor is configured to log compressor run time directly, using a set point to start a timer when the compressor switches ON and capturing the value of the timer (the running time) when the compressor switches OFF.

Figure 2:
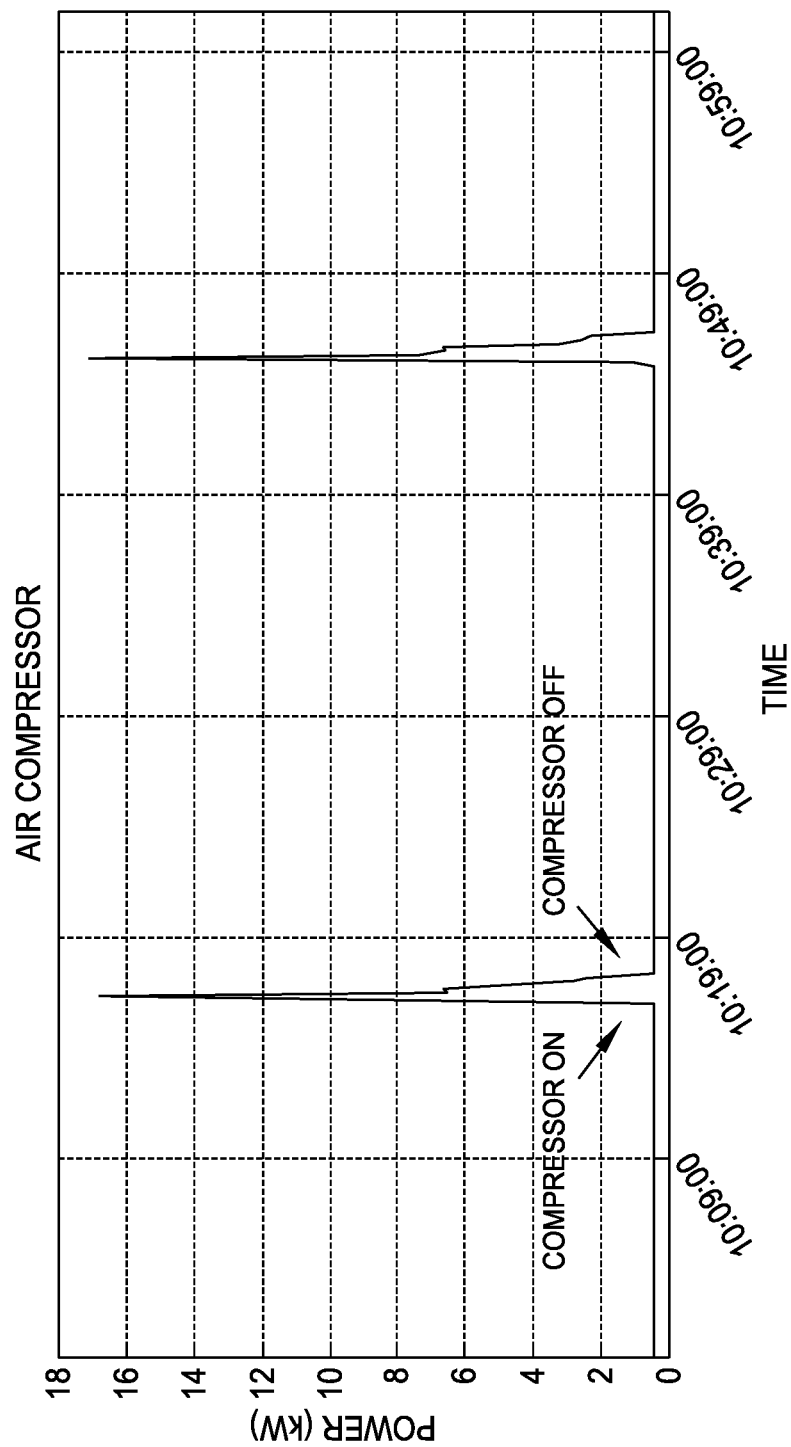
FIG. 2 is a graph of an air compressor power profile showing power (kW) versus time.

As an example, reference can be made to a graph of air compressor operation shown in FIG. 2. This graph shows power use (in kW) of the compressor over time, with the compressor drawing a small amount of power (below 1 kW) when OFF and much more power (more than 1 kW) when operating. To implement step 12, a monitor can be configured to measure total kW and track running time when the compressor draws more than 1 kW of power. The compressor starts a timer when the compressor draws more than 1 kW, stops the timer when the compressor uses less than 1 kW, and logs the running time (with a timestamp) for that compressor operation.

In step 14, periods of time during which the compressor of the compressed air system is not in use are identified. These non-use periods may be specified periods of time, such as between certain hours of the day, or days in the week, or between scheduled shifts. Alternately, non-use periods may be identified when the compressor energy consumption over some interval, such as hourly, is below some threshold.

Another way to detect non-use periods is to examine running time duration and intervals between compressor operations for an expected pattern. During non-use periods, the pattern is one of brief, consistent running time durations and consistent intervals between compressor operations. When the compressed air system is in use, however, the running time durations and intervals between compressor operations vary widely. Threshold values for running time and/or the interval between compressor operations may be defined to identify non-use periods. These threshold values would typically be defined for a minimum continuous period, e.g., an interval of at least twenty-five minutes between compressor operations over a continuous period of at least twelve hours.

Figure 3A:
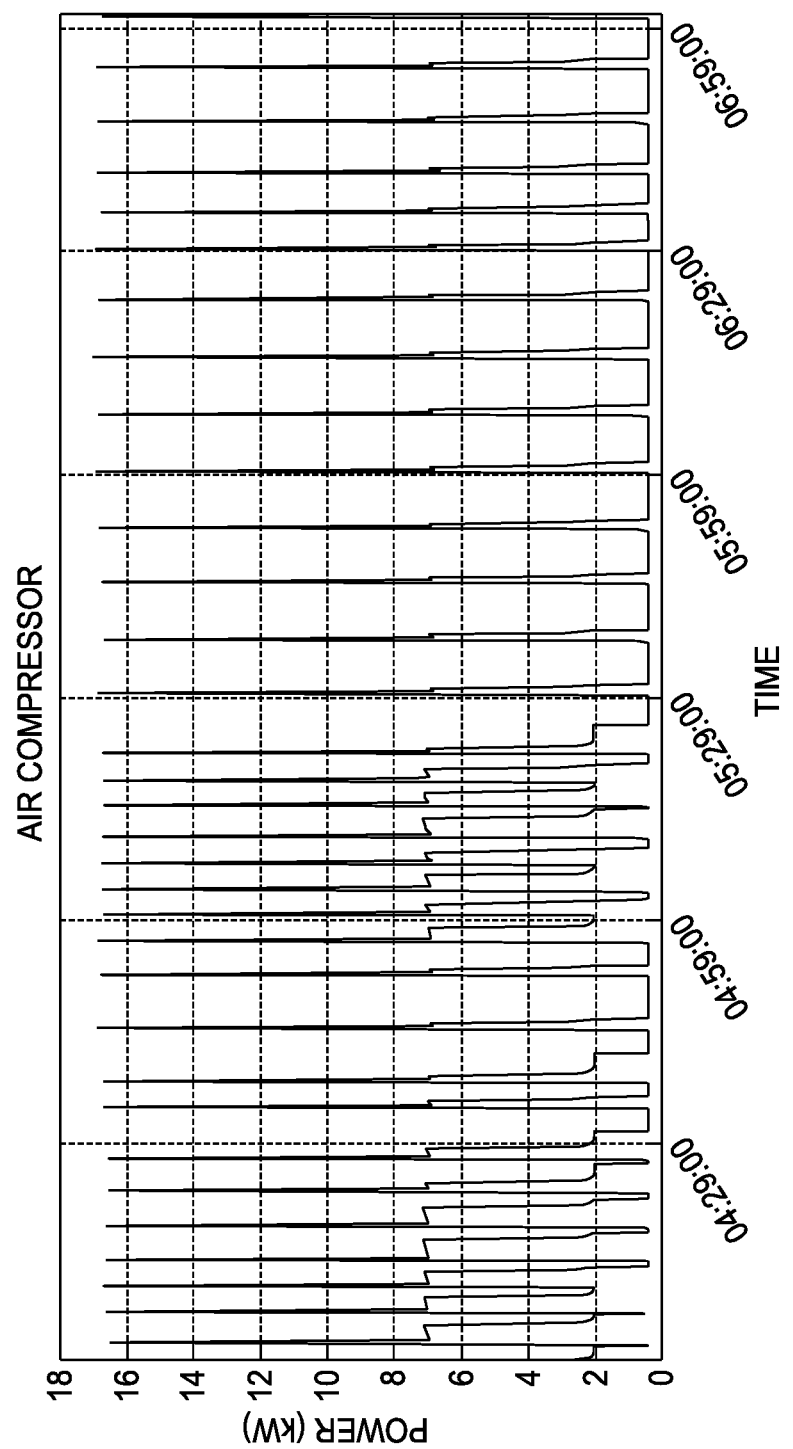
FIG. 3A is a graph of an air compressor power profile when a compressed air system is in use showing power (kW) versus time.
Figure 3B:
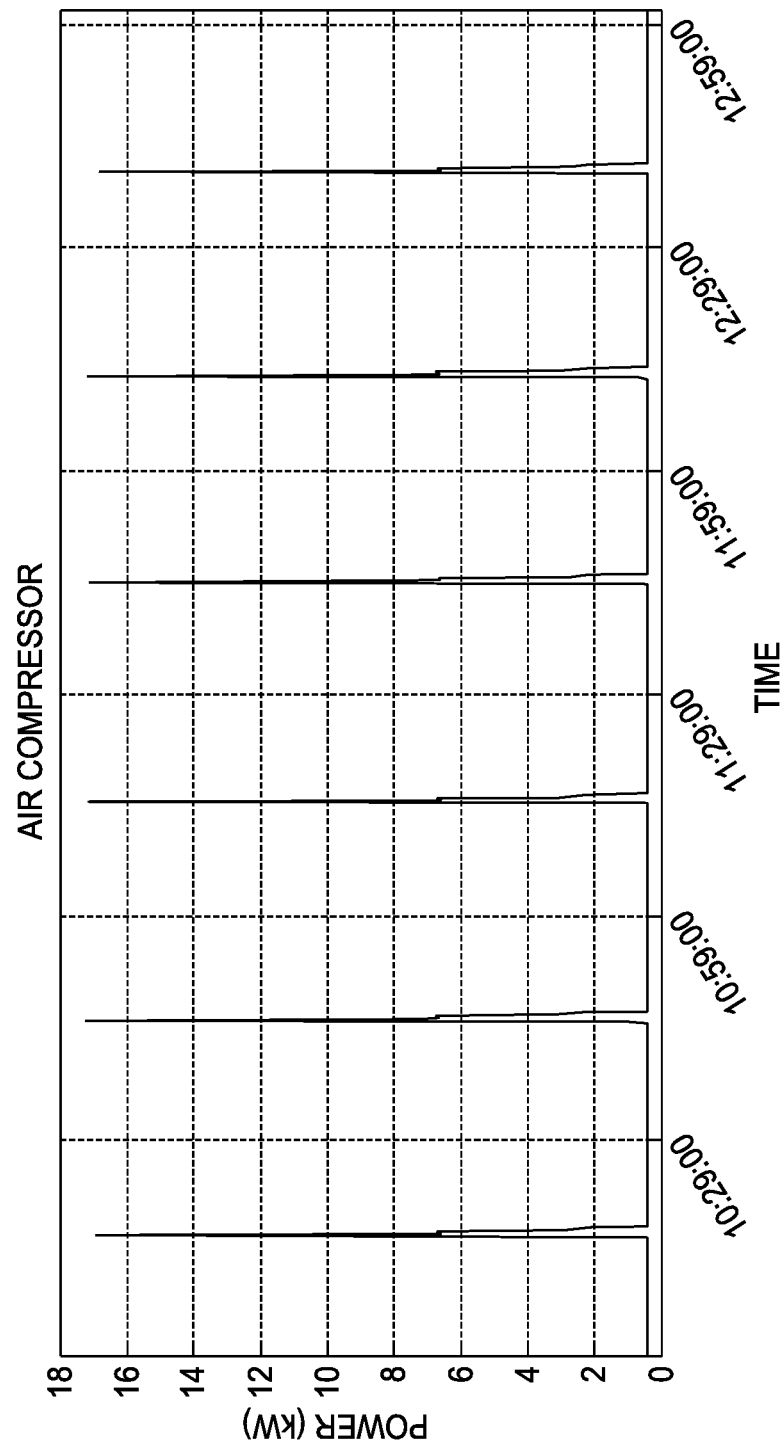
FIG. 3B is a graph of an air compressor power profile when a compressed air system is not in use showing power (kW) versus time.

As an example, reference can be made to the charts shown in FIGS. 3A and 3B. FIG. 3A shows a power profile of the compressor when the compressed air system is in use, and the variation in compressor running times and the intervals between compressor operations is apparent. FIG. 3B, on the other hand, shows regular intervals between compressor operations with consistent running times when the compressor of the compressed air system is not in use.

In step 16, the compressor running times and intervals between compressor operations are analyzed to establish a baseline for air leakage in the compressed air system. Baseline values are established by generating summary values of running time and the interval between compressor operations over some number of non-use periods. As an example, summary values may be generated by taking the mean and standard deviation of running time and the interval between compressor operations over several non-use periods.

In step 18, the summary values of running times and intervals between compressor operations are generated for current non-use periods and compared to the baseline summary values. If the current summary value differs by some predetermined amount from the baseline summary value, a notification is sent to one or more users and displayed on the monitor. The predetermined amount may be expressed as a statistically significant difference between the baseline summary values and current summary values. Optionally, in addition to requiring statistical significance in the difference, the predetermined amount may need to exceed a threshold that represents an increase or decrease in air leakage that is of interest to a user. Alternately, a user may configure the monitoring system to report current summary values, and optionally compared with baseline summary values, at scheduled intervals, such as weekly.

As an example, the patterns evident in compressor running times and intervals between compressor operations are shown in FIGS. 4A and 4B, respectively. FIG. 4A is a chart showing variation in compressor running time (over time) with two periods of non-use marked on the chart. FIG. 4B covers the same time span as FIG. 4A, showing variation in the interval between compressor operations over time, with the same two periods of non-use marked on the chart. Although no variation in running time between the non-use periods is apparent in FIG. 4A, there is a difference in the interval between compressor operations visible between the non-use periods in FIG. 4B. The earlier period of non-use has intervals around 1400 seconds while the later period of non-use has intervals slightly above 1500 seconds. Since the later non-use period has a longer interval between compressor operations, something has changed in the compressed air system to reduce air leakage.

When a large enough difference in compressor run time and/or interval between compressor operations is detected, a notification is sent to one or more users. Knowing when the change occurred may assist a technician in targeting a specific section of the compressed air system. As an example, if an increase in air leakage occurred when a new piece of equipment as attached to the compressed air system, the technician may start with an examination of the new equipment.

The notification may include additional details describing the change in air leakage. The notification may simply note the difference between the current summary values and baseline summary values. Alternately, the notification may report the change in operational terms, describing the increase or decrease in the number of compressor operations per month represented by the change in air leakage. The monitoring system may optionally be configured to capture the energy consumed during each compressor operation, and calculate some average, such as a moving average, increase or decrease in energy consumption due to the change in air leakage. The change in energy consumption could also be calculated as a cumulative summation over time. If the monitoring system has access to energy cost information, the increase or decrease in energy consumption could be reported as a moving average cost or cumulative summed cost.

Embodiments of the method described herein can also be used in applications where pumps and compressors are used to keep fluids or gases in a storage tank at some pressure or level, and there are periods during which the system drawing from the storage tank is not used.

Other sensors, such as a fuel consumption flow rate sensor may be used as well.

The sensor controller is designed to receive the representative signals from the various indicators. The controller may include amplifiers, band pass filters, data storage units, a CPU, gauge bridges, A/D converters and other devices as are known in the art. For example, the processor may convert analog signals to digital signals as necessary. The controller may include a calculator, timing and other circuitry, converter software, storage capacity and cumulative mathematical calculations.

The sensor controller may include many members and be located on or off-site or partially off-site. That is, the controller is not limited to a single physical location. The controller may compute or monitor certain parameters on-site while transmitting these or other parameters to an off-site control room. On-site monitoring and control may, for example, include emergency shut-down control in the case of an actual or impending failure. The controller may be used to control the compressor operation. Typically, at least some of the controller function is remote to the compressor site.

The sensor controller may function as the central processing unit carrying out the logic functions of the apparatus. The controller may comprise a single computer or a multiplicity of computers or other calculator devices. The controller may be located on site or remote from the compressor. It is anticipated that the controller may most likely be remote from the compressor and will receive data from a plurality of compressors spread over a wide geographic area. The controller may contain a microprocessor, digital input and output subsystems, memory capacity in which is stored various mathematical and analytical programs and software and constant data regarding the compressor being analyzed. One of the primary functions of the controller is to compute, using the representative data signals, the work performed by the compressor during a predetermined time interval. The controller may include the necessary formulas for repetitive calculations of performance parameters. Preferably the controller, in conjunction with other sensors and transmitter/receiver pair, permits continuous real-time monitoring of the compressor. Real-time and continuous work calculations can then be performed and monitored.

Other calculations may be made as well, such as the computation of work and power based on pressure measurements. The measurements and results of the calculation can then be used for optimization of the efficiency and use of the compressor. That is, the resulting data from the computer may be used to regulate the operation of the compressor to maximize the efficiency of the unit. Where several compressor units are being monitored simultaneously, the compressors can each be regulated to maximize the efficiency of the pipeline operation as a whole. The compressor utilization, health and integrity is then used by the compressor controllers (either human or software based) to affect operation in an optimized fashion. The optimization and regulation of the compressor units can be done manually, by remote transmission or direct manipulation, or automatically through the use of computer optimization software.

Optimization can also include automatic shut-downs where the measured parameters indicate a failure or danger of catastrophic failure.

In one embodiment, the controller may include many members and be located on or off-site or partially off-site with respect to the compressor. Specifically, the controller may not be limited to a single physical location. The controller may compute or monitor certain parameters on-site while transmitting these or other parameters to an off-site control room. On-site monitoring and control may, for example, include emergency shut-down control in the case of an actual or impending failure. The controller will be used to control the compressor operation. Typically at least some of the controller function is remote to the compressor site. The unit controller may function as the central processing unit carrying out the logic functions of the device. The controller may comprise a single computer or multiple computers or other calculator devices. The controller may be located on site or remote from the compressor. The controller may contain a microprocessor, digital input and output subsystems, memory capacity in which is stored various mathematical and analytical programs and software and constant data regarding the compressor being analyzed. One of the primary functions of the controller is to compute, using the representative data signals, the work performed by the compressor during a predetermined time interval. The controller may include the necessary formulas for repetitive calculations of performance parameters. Preferably the controller, other sensors and transmitter/receiver pair, permits continuous real-time monitoring of the compressor. Real-time and continuous work calculations can then be performed and monitored.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method of detecting leakage in a compressed air system having a compressor, the method comprising:
    configuring an electrical monitor to measure one or more electrical parameters indicative of operation of the compressor;
    identifying periods of time during which the compressed air system is not in use;
    analyzing running times and intervals of the compressor between compressor operations during one or more of identified periods of time to establish a baseline for constant air leakage, the baseline being derived from a regular pattern of brief air compressor operations;
    continuing to analyze running times and intervals of the compressor between compressor operations when the compressor is not in use; and
    notifying one or more users when running times and intervals between compressor operations vary from the baseline,
    wherein analyzing the running times and intervals of the compressor between compressor operations includes monitoring lengths of periods of running times and the lengths of intervals of non-operation of the compressor.

2. The method of claim 1, wherein configuring an electrical monitor to measure one or more electrical parameters includes capturing and logging compressor running time each time the compressor operates.

3. The method of claim 2, wherein the one or more electrical parameters includes an ON state and an OFF state of the compressor.

4. The method of claim 3, wherein example parameters include kilowatts (kW), kilovolts-amperes reactive (kvar), kilovolt-amps (kVA), or average phase current.

5. The method of claim 3, wherein a parameter value marking a boundary between the ON and OFF states of the compressor is selected.

6. The method of claim 3, wherein operation of the compressor includes start times and stop times, with start times defined as a change from the OFF to ON state, and stop times defined as a change from the ON to OFF state.

7. The method of claim 2, wherein the monitor logs parameter values at regular intervals, and a controller receiving log data determines the compressor start, stop, and running times.

8. The method of claim 2, wherein the monitor is configured to log compressor run times directly, using a set point to start a timer when the compressor switches ON and capturing the value of the timer when the compressor switches OFF.

9. The method of claim 1, wherein periods of time during which the compressor is not in use are identified by specified periods of time including between certain hours of the day, or days in the week, or between scheduled shifts.

10. The method of claim 1, wherein periods of time during which the compressor is not in use are identified when compressor energy consumption over a predetermined interval is below a threshold.

11. The method of claim 1, wherein periods of time during which the compressor is not in use are identified by examining running time duration and intervals between compressor operations for an expected pattern.

12. The method of claim 1, wherein compressor running times and intervals between compressor operations are analyzed to establish a baseline value for air leakage in the compressed air system.

13. The method of claim 12, wherein the baseline value is established by generating baseline summary values of running times and the intervals between compressor operations over several non-use periods.

14. The method of claim 13, wherein current summary values of running times and intervals between compressor operations are generated for current non-use periods and compared to the baseline summary values.

15. The method of claim 14, wherein if the current summary values differ by a predetermined amount from the baseline summary values, a notification is sent to one or more users.

16. The method of claim 15, wherein the predetermined amount is represented as a statistically difference between the baseline summary values and the current summary values.

17. The method of claim 15, wherein the predetermined amount exceeds a threshold that represents an increase or decrease in air leakage that is of interest to a user.

18. The method of claim 1, wherein the monitoring system is configured to report current summary values at scheduled intervals.

* * * * *